US010902501B2

(12) United States Patent
Engelen et al.

(10) Patent No.: US 10,902,501 B2
(45) Date of Patent: Jan. 26, 2021

(54) METHOD OF STORING OBJECT IDENTIFIERS

(71) Applicant: SIGNIFY HOLDING B.V., Eindhoven (NL)

(72) Inventors: Dirk Valentinus René Engelen, Heusden-Zolder (BE); Bartel Marinus Van De Sluis, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/345,897

(22) PCT Filed: Oct. 16, 2017

(86) PCT No.: PCT/EP2017/076292
§ 371 (c)(1),
(2) Date: Apr. 29, 2019

(87) PCT Pub. No.: WO2018/077640
PCT Pub. Date: May 3, 2018

(65) Prior Publication Data
US 2020/0051154 A1 Feb. 13, 2020

(30) Foreign Application Priority Data
Oct. 27, 2016 (EP) ..................... 16195909

(51) Int. Cl.
*G06Q 30/06* (2012.01)
*G06K 7/10* (2006.01)
(Continued)

(52) U.S. Cl.
CPC ..... *G06Q 30/0633* (2013.01); *G06K 7/10297* (2013.01); *G06K 7/10366* (2013.01); *G06K 7/1417* (2013.01); *G08B 5/36* (2013.01)

(58) Field of Classification Search
CPC .......... G06Q 30/0633; G06K 7/10297; G06K 7/10366; G06K 7/1417; G08B 5/36
See application file for complete search history.

(56) References Cited

U.S. PATENT DOCUMENTS 9,607,487 B2 * 3/2017 Dureau .................... G08B 5/36
2012/0067954 A1 * 3/2012 Moganti ................ H04N 5/232
235/451
(Continued)

FOREIGN PATENT DOCUMENTS

EP 2030189 B1 11/2016
WO 2010116299 A1 10/2010

*Primary Examiner* — Mohamed Barakat
(74) *Attorney, Agent, or Firm* — Meenakshy Chakravorty

(57) ABSTRACT

A method (900) of storing object identifiers is disclosed. The method (900) comprises detecting (902) light emitted by a light source (110), which light comprises an embedded code representative of an identifier of an object (120), retrieving (904) the code from the light, retrieving (906) the identifier from the code, receiving (908) a user input indicative of a selection of the object (120), storing (910) the identifier of the object (120) in a memory upon receiving the user input, and changing (912) the color, saturation and/or the intensity of the light emitted by the light source (110) upon receiving the user input.

14 Claims, 9 Drawing Sheets

(51) Int. Cl.
    *G06K 7/14*    (2006.01)
    *G08B 5/36*    (2006.01)

(56) References Cited

U.S. PATENT DOCUMENTS

| | | | |
|---|---|---|---|
| 2015/0084781 A1* | 3/2015 | Papakos | G08B 7/06 340/815.45 |
| 2015/0282282 A1 | 10/2015 | Breuer et al. | |
| 2016/0091217 A1* | 3/2016 | Verberkt | H05B 37/034 700/276 |
| 2016/0098584 A1* | 4/2016 | Van De Sluis | H04B 10/116 340/10.3 |

* cited by examiner

METHOD OF STORING OBJECT IDENTIFIERS

CROSS-REFERENCE TO PRIOR APPLICATIONS

This application is the U.S. National Phase application under 35 U.S.C. § 371 of International Application No. PCT/EP2017/076292, filed on Oct. 16, 2017, which claims the benefit of European Patent Application No. 16195909.3, filed on Oct. 27, 2016. These applications are hereby incorporated by reference herein.

FIELD OF THE INVENTION

The invention relates to a method of storing object identifiers. The invention further relates to a computer program product for executing the method. The invention further relates to a system for storing object identifiers.

BACKGROUND

Smart devices, such as smartphones, are becoming our shopping assistants in stores. Examples of such shopping assistants include indoor positioning guidance systems, position or user based advertisements, augmented product information, etc. Retailers are more and more looking for solutions for omni-channel retailing wherein physical and digital retail channels are seamlessly integrated. For instance, retail environments may become interactive showrooms or experience centers where the products can be seen, experienced, used and ordered.

U.S. patent application 2016/0091217 A1 discloses a luminaire that transmits a signal comprising one or more identification codes, for example, a coded light signal. An environment control device, such as a smartphone, receives the signal, detects user input indicating one or more preferred environmental conditions, and transmits an environment control request. The luminaire is then controlled according to the preferred environmental conditions.

SUMMARY OF THE INVENTION

It is an object of the present invention to provide a method for adding objects to a list and for providing feedback when the objects have been added to the list.

According to a first aspect of the present invention, the object is achieved by a method of adding an object to a list, the method comprising:
detecting light emitted by a light source, which light comprises an embedded code representative of an identifier of an object, the object not being the light source,
retrieving the code from the light,
retrieving the identifier from the code,
receiving a user input indicative of a selection of the object,
adding the identifier of the object to the list upon receiving the user input, and
changing the color, saturation and/or the intensity of the light emitted by the light source upon receiving the user input.

The light output of the light source may be received by a mobile device, whereupon the object is identified based on the identifier comprised in the light emission. This enables a user to select an object by pointing a light detector (e.g. a camera or a photodiode) of the mobile device to the light source (or the light effect generated by the light source) which is associated with the object, and add the object to a list by providing the user input. The list (which is stored in a memory) may, for example, be a shopping list (shopping cart), a favorites list, a recipe, etc. The light output (the color, saturation and/or the intensity) of the light emitted by the light source is changed upon receiving the user input. This is beneficial, because it indicates to a user operating the mobile device that the object has been added to a list in the memory.

The code emitted by the light source comprises the identifier of the object. The (controller of the) light source may be commissioned in advance such that the light source emits light comprising the identifier that is associated with a respective object. In other words, the association between the object and the light source may be predefined. Alternatively, a detector may detect which object is located at the light source (or which object is illuminated by the light source) in order to determine which code (and therewith which identifier) to emit. The object may for example comprise a tag (e.g. an RFID tag, a QR code, an NFC tag, etc.) which may be detected by a tag reader for identifying the object located at or nearby the light source.

The method may further comprise the step of changing the color, saturation and/or the intensity of the light source back to an original color and/or intensity after a period of time. The light source may for example blink briefly in order to indicate to a user that the object has been added to (a list in) the memory.

The method may further comprise the step of changing the color, saturation and/or the intensity of the light source back to an original color and/or intensity when the code is no longer detected. This may be beneficial if there are multiple users with multiple mobile devices for detecting the light output and for receiving the user input. For example, if a first user has added the object to a list in the memory, the light output of the light emitted by the light source is changed. When the user moves away from the object (and also away from the product) and the light (and therewith the code) is no longer detected, the light source is controlled and changed back to an original color and/or intensity. If a new user approaches with a mobile device, he or she may add the object to his or her own list, whereupon the light output is changed again accordingly.

The method may further comprise the steps of: capturing an image of the object and rendering the image on a display. This is beneficial because it enables a user to see the object on the display. The display may, for example be a touch display arranged for receiving the user input.

The method may further comprise the steps of: retrieving object information of the object based on the identifier, generating a virtual representation, which virtual representation is representative of the object information and rendering the virtual representation of the object on a display. The virtual representation may be selectable by a user, which enables the user to provide the user input by selecting the virtual representation.

The user input may be indicative of a step of a plurality of steps in a process, and the step of changing the color, saturation and/or the intensity of the light emitted by the light source upon receiving the user input may comprise changing the color, saturation and/or the intensity of the light based on the step. The step in the process may, for example, be a step of adding the object to a shopping list, or buying the object (i.e. completing a payment for the object). Each step in the process may have a (unique) light setting associated with it. This is beneficial, because it enables a user to see at which step in the process the user is.

The step of receiving the user input indicative of the selection of the object may comprise receiving a first user input or a second user input as the user input, and the step of storing the identifier of the object in a memory upon receiving the user input may comprise storing the identifier of the object in a first part of the memory upon receiving the first user input or storing the identifier of the object in a second part of the memory upon receiving the second user input. This enables a user to add an object to a first list or a second list by providing a different user input. A user may, for example, swipe to one direction on a touch sensitive surface to add the object to a 'favorites' list, and swipe in another direction to add the object to a 'shopping cart' list. Additionally, the step of changing the color, saturation and/or the intensity of the light emitted by the light source upon receiving the user input may comprise changing the color, saturation and/or the intensity of the light source according to a first light setting upon receiving the first user input or changing the color, saturation and/or the intensity of the light source according to a second light setting upon receiving the second user input. This is beneficial, because the change of the light output (the change of color, saturation and/or intensity) reflects to which list (part of the memory) the object has been added (for example blue light for adding the object to a favorites list and orange light for adding the object to a shopping cart).

The method may further comprise the steps of: detecting a presence of a mobile device, identifying the mobile device and changing the color, saturation and/or the intensity of the light emitted by the light source based on the identification of the mobile device. The presence of the mobile device may for example be detected/determined when the mobile device detects the light comprising the embedded code. This is beneficial, for example when a user approaches an object that has already been added to a list in the memory. This enables a user to see that he or she has already added that object to a list. The light output (the color, saturation and/or the intensity of the light) may further indicate to which list the object has been added.

According to a second aspect of the present invention, the object is achieved by a computer program product for a computing device, the computer program product comprising computer program code to perform any one of the above-mentioned methods when the computer program product is run on a processing unit of the computing device.

According to a third aspect of the present invention, the object is achieved by a system for adding an object to a list, the system comprising: a mobile device comprising:
a light detector for detecting light emitted by a light source, which light comprises an embedded code representative of an identifier of the object, the object not being the light source,
a processor for retrieving the code from the light and for retrieving the identifier from the code, and
a user interface for receiving a user input indicative of a selection of the object, wherein the processor is arranged for adding the identifier of the object to the list upon receiving the user input, and
wherein the system further comprises a controller for changing the color, saturation and/or the intensity of the light emitted by the light source upon receiving the user input.

The mobile device may further comprise a display, and the processor may further be arranged for rendering a virtual representation of the object on the display. Additionally, the user interface may be arranged for receiving a first user input and a second user input as the user input, and the processor may be further arranged for storing the identifier of the object in a first part of the memory upon receiving the first user input, and for storing the identifier of the object in a second part of the memory upon receiving the second user input. Additionally, the controller may be arranged for changing the color, saturation and/or the intensity of the light source according to a first light setting upon receiving the first user input, and for changing the color, saturation and/or the intensity of the light source according to a second light setting upon receiving the second user input.

The system may further comprise the light source, and the light source may be comprised in a supporting member arranged for supporting the object. Alternatively, the light source may be arranged for illuminating the object. It is beneficial if the object and the light source are in each other's vicinity, or if the light source illuminates the object, because then the relation between the light source and the object is clear.

It should be understood that the claimed system may have similar and/or identical embodiments and advantages as the claimed method.

BRIEF DESCRIPTION OF THE DRAWINGS

The above, as well as additional objects, features and advantages of the disclosed systems, mobile devices and methods will be better understood through the following illustrative and non-limiting detailed description of embodiments of devices and methods, with reference to the appended drawings, in which:

FIG. 5b shows schematically an embodiment of a mobile device according to the invention which captures the product display of FIG. 5a;

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
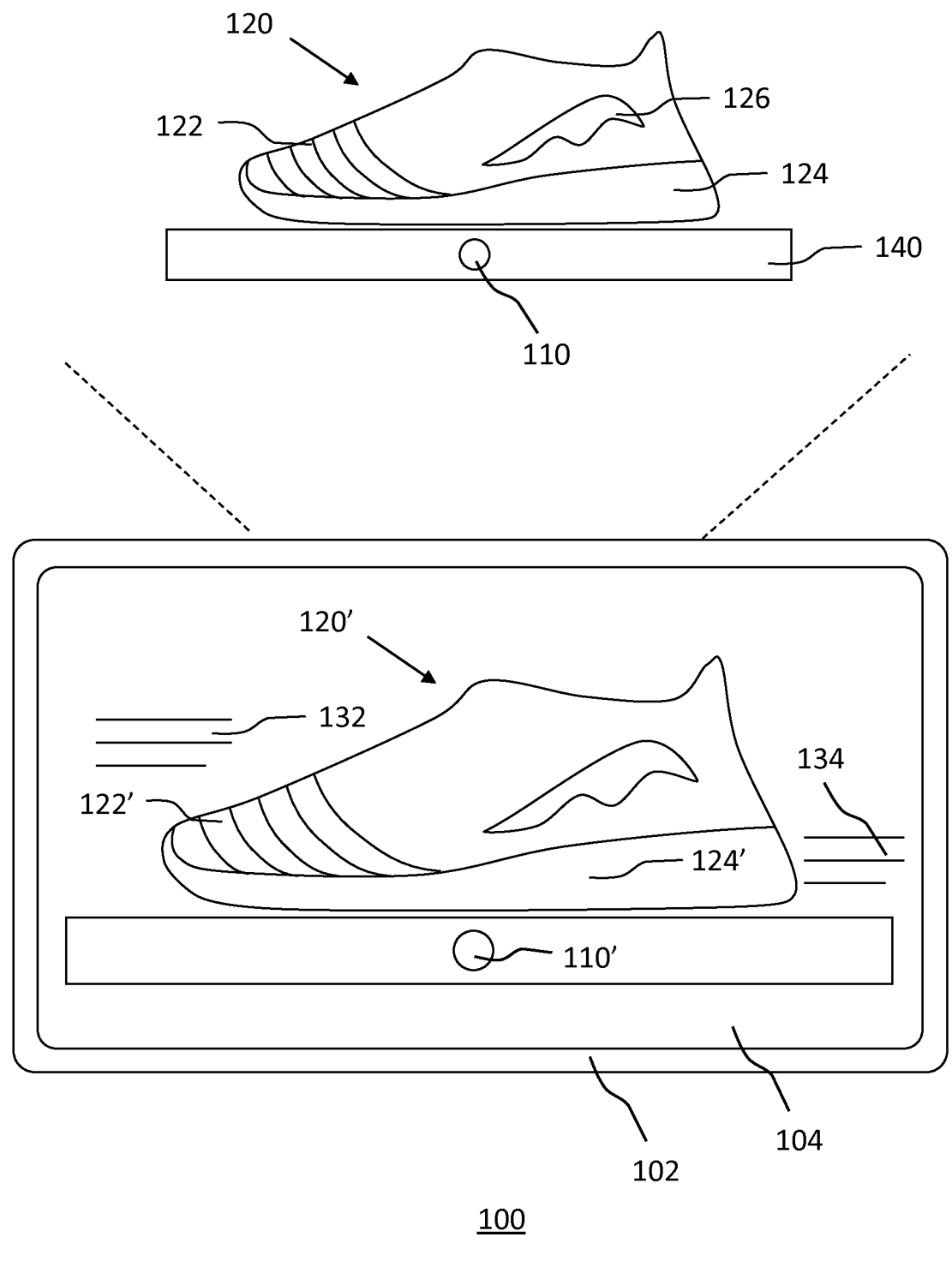
FIG. 1 shows schematically an embodiment of a system according to the invention for providing information about an object.

FIG. 1 shows schematically an embodiment of a system 100 according to the invention for providing information about an object 120. The system 100 comprises a mobile device 102 for providing information 132, 134 about an object 120. The mobile device 102 may be any type of mobile device 120. Examples of a mobile device include but are not limited to portable smart devices, such as smartphones and tablet pcs, and wearable smart devices such as smart watches and smart goggles. The mobile device 102 may be arranged for capturing an image 104 of the object 102 and for detecting light emitted by a light source 110, which light comprises an embedded code representative of object information about the object 120. The mobile device 102 may comprise a display and a processor (not shown) arranged for retrieving the code from the light. The processor may be further arranged for retrieving the object information, for identifying an object feature of the object in the image 104, for determining an object feature position of the object feature in the image 104, for generating a virtual representation of the object information, for determining a position of the virtual representation in the image 104, wherein the position is related to the object feature position in the image 104, for rendering the image 104 (and therewith the object 120') on a display, and for rendering the virtual representation at the position as an overlay on the image 104.

FIGS. 1-6 illustrate examples of objects 120. In these examples the object is a shoe, but it should be noted that the object can be any type of object. Examples include but are not limited to consumer goods such as clothing, food, vehicles, household appliances, robots and electronic devices and animate objects such as animals. The object 120 is not the light source 110 which emits the light comprising the embedded code representative of an identifier of the object. In other words, the light source (and the lighting device/luminaire comprising the light source) and the object 120 are different objects.

The processor (e.g. a microchip, circuitry, a microcontroller, etc.) of the mobile device 102 may be arranged for retrieving the code from the light. The mobile device 102 may comprise a light detector (such as a photodiode) for detecting the code in the light emitted by the light source 110 and a camera (not shown) for capturing the image 104 of the object. Alternatively, the mobile device 102 comprises a camera for capturing the image 104 of the object and for detecting the light emitted by the light source. The camera may, for example, be a rolling shutter camera or a global shutter camera. Techniques for retrieving the code from the light (either by photodiode or by camera) are well known in the art and will not be discussed further.

The processor of the mobile device 102 may be arranged for retrieving the object information. The object information may be retrieved based on the code. The code may comprise, for example, an identifier of the object 120. The processor may be arranged for accessing a (remote) memory, which memory may be arranged for storing associations between object identifiers and object information. The processor may compare the identifier of the object 120 with the stored identifiers, and, if a stored identifier matches the object identifier, determine the object information for the identified object 120. Additionally or alternatively, the code may comprise a link to the object information. The link may, for example, be a URL or a hyperlink which comprises an address that points to a location where the object information is stored. This enables the processor to find the object information of the object 120 based on the link. Additionally or alternatively, the code may comprise the object information. In the latter, the processor may directly retrieve the object information from the code.

The object information may, for example, be price information, material information, size information, stock information, color information, product age information, availability information, user review information, object score information and/or popularity information. The object information may comprise multiple types of object information (e.g. size and price information).

The processor may be further arranged for identifying an object feature 122, 124, 126 of the object 120' in the image 104. The processor may comprise an image analysis module for identifying the object feature. The object feature 122, 124, 126 may be related to an outline of at least a part of the object 120, a color of at least a part of the object 120, an area of least a part of the object 120, a pattern of at least a part of an object 120 and/or a marker (e.g. a barcode or a QR-code) attached to the object 120. The processor may, for example, identify the object feature 122, 124, 126 of the object 120' in the image 104 by accessing a memory arranged for storing object feature information about at least one object, comparing at least a part of the image 104 with stored object feature information, so as to determine if a similarity criterion has been met between a stored object feature and the at least a part of the image 104, and identifying, if the similarity criterion has been met, the object feature 122, 124, 126 in the image 104. It should be noted that any image analysis technique for identifying objects and object features from images 104 known in the art may be used for identifying the object feature. FIG. 1 illustrates three object features that may be identified: a first object feature 122 (i.e. the nose of the shoe 120 the striped pattern), a second object feature 124, (i.e. the sole of the shoe 120) and a third object feature 126 (i.e. the logo on the shoe 120).

Upon identifying an object feature 122, 124, 126 of the object 120 in the image 104, the processor may determine a position of the object feature (the object feature position) in the image 104. The image analysis module may be arranged for determining this position. The position of the object feature may be an area in the image 104 with specific coordinates in the image. The processor may be arranged for determining a plurality of positions of different object features. Object features may, for example, be part of other object features (e.g. a first object feature may be the outline of the shoe 120, and a second object feature may be the logo 126 on the shoe 120, which is located in the area created by the outline of the shoe). It should be noted that any image analysis technique known in the art may be used for determining a position of an object feature in an image 104.

The processor may be further arranged for generating a virtual representation 132, 134 of the object information. The virtual representation 132, 134 may, for example, be text, a color, a logo, a virtual price tag, a video, an animation, a feedback button, a virtual character (e.g. providing spoken instructions related to the object feature), or an alternative object feature (e.g. showing alternative colors for the object or object part) etc. representative of the object information. The processor may be further arranged for determining a position of the virtual representation 132, 134 in the image 104, wherein the position is related to the (previously determined) object feature position in the image 104. The processor may be arranged for determining the position of the virtual representation 132, 134 such that it is different from the object feature position. The position of the virtual representation may for example be an area in the image 104 with coordinates different from the coordinates of the area of the object feature position. The processor may be arranged for determining the position of the virtual representation 132, 134 such that it is in vicinity of the object feature position. The position of the virtual representation may for example be an area in the image 104 with coordinates nearby the coordinates of the area of the object feature position.

FIG. 1 illustrates such an example. The processor (not shown) of the mobile device 102 may determine the position of the sole 124' of the shoe 120' in the image 104, and determine a position for the virtual representation 134 of the object information about the sole 124 of the shoe 120. In this example, the virtual representation is textual information about the object information about the object feature 124, for example information about the materials used for the sole 124 of the shoe 120.

The processor may be arranged for determining a plurality of positions of different object features 122, 124, 126, and the processor may position the virtual representation of an object feature in relation to the position of that object feature and in relation to the other object features. For example, the processor may identify a first object feature (e.g. the outline of the shoe 120') and a second object feature (e.g. the striped nose 122' of the shoe 120') in the image 104 and determine to position the virtual representation 132 of the object information about the object feature 122 outside the outline of the shoe 120'. In this example, the virtual representation 132 is textual information about the object information about the object feature 122, for example information about the pattern on the nose 122 of the shoe 120.

Figure 2A:
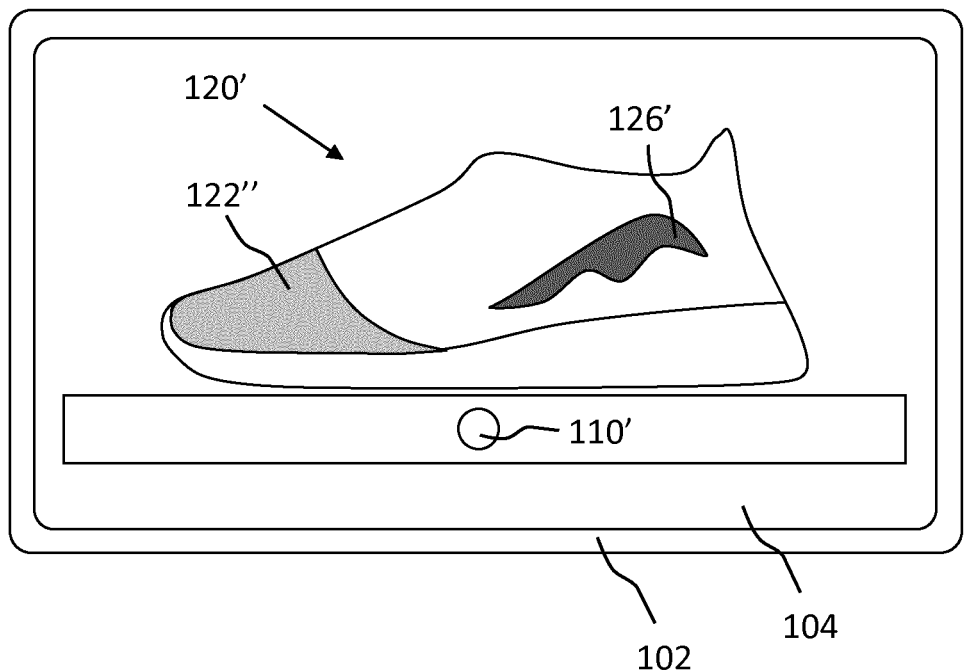
FIGS. 2a and 2b show schematically embodiments of a mobile device according to the invention for providing information about an object.

The processor may be arranged for determining the position of the virtual representation 132, 134 such that it overlaps the object feature position. The position of the virtual representation 132, 134 may for example be an area in the image 104 with coordinates similar to the coordinates of the area of the object feature position. FIG. 2a illustrates such an example. The processor (not shown) of the mobile device 102 may determine the position of the nose 122' of the shoe 120' in the image 104, and determine a position for the virtual representation 122" of the object information about the nose 122 of the shoe 120. The position of the virtual representation 122" is in this case the same position as the position of the object feature 122'. The virtual representation 122" is in this example an overlay on top of the 'actual' shoe 120. This enables a user operating the mobile device 102 to see how the object feature may look like. Additionally, a user may provide a user input to change the virtual representation 122" to a different representation (e.g. by selecting a different color for the nose of the shoe) to see how the shoe would look like in that color. In a similar fashion, the user may select a different color for the logo 126' on the shoe 120'.

The processor may be further arranged for rendering the image on a display, and for rendering the virtual representation at the position as an overlay on the image. Examples of displays include but are not limited to LED displays, LCD displays and OLED displays. In embodiments, as illustrated in FIG. 6a, the mobile device may be smart glasses 602. The smart glasses may comprise a camera 608 for detecting the object 120 and a display 604. The display may be at least one of the glasses 604 of the smart glasses 602. Alternatively, the display may be a projector arranged for projecting the virtual indicator on the glasses or on the eye of the user of the smart glasses. A user wearing the smart glasses may see the object 120 physically through the glasses, whereupon the virtual representation of 606 of the object information may be rendered on the glasses, projected on the glasses or on the user's eye. In this case, rendering the image on the smart glasses may not be required because the user can see the physical object through the glasses. As a result, the virtual representation is rendered as a virtual overlay on top of the physical world.

The mobile device 102 may comprise a camera arranged for capturing a stream of images (a video) of the object 120, and the processor may be arranged for identifying an object feature of the object in the image, for determining an object feature position of the object feature in the image, for generating a virtual representation of the object information, for determining a position of the virtual representation in the image, wherein the position is related to the object feature position in the image, for rendering the image on a display and for rendering the virtual representation at the position as an overlay on the image for each image in the stream of images, or for a selected set of images in the stream of images. The processor may, for example, be arranged for executing the above-mentioned steps once every predetermined time period (e.g. every second) when the stream of images is captured. This may reduce the required computing power for the processor. Capturing a stream of images and rendering the images and the virtual representation over time provides the advantage that the user experiences frequent updates and up-to-date positioning of the virtual representation on top of the captured physical world.

The mobile device 102 may further comprise a user interface for receiving a user input related to a selection of the virtual representation. The user interface may be any type of interface arranged for receiving user input. The user interface may for example comprise a touch-sensitive device such as a touchpad, a touchscreen, one or more buttons and/or one or more sliders for receiving touch input. Additionally or alternatively, the user interface may comprise a microphone arranged for receiving voice commands from the user operating the mobile device. Additionally or alternatively, the user interface may comprise a gesture/motion detection means, such as a gyroscope and/or an accelerometer arranged for detecting gestures made with the mobile device 102, which gestures may be indicative of a selection of a virtual representation. Examples of such gestures are shaking the mobile device 102 or changing the orientation of the mobile device 102. The mobile device 102 may, for example, be smart glasses, and the shaking of a person's head may be the gesture. Additionally or alternatively, the user interface may comprise a camera (e.g. a front facing camera on a smartphone) arranged for detecting user gestures indicative of a selection of a virtual representation. Examples of such gestures are hand movements, eye-blinking, head shaking, etc. Additionally or alternatively, the user interface may comprise a means (e.g. a camera) for gaze detection and selection of a virtual representation may be based on a time period of gazing towards the position of the object. It should be noted that the above-mentioned user interfaces are mere examples of user input elements and illustrate rather than limit the invention, and that those skilled in the art will be able to design many alternative user interfaces without departing from the scope of the appended claims.

Upon receiving the user input, the processor may be arranged for rendering additional information about the object feature on the display. The additional information may, for example, be audio or video content. The additional information may be communicated from a central server (e.g. a server of the store wherein the product is for sale) to the mobile device via a wireless network. This enables a user to request additional information about the object feature. The processor may further be arranged for generating a message upon receiving the user input, which message is related to the object information. The object information may, for example, be related to a size of the shoe, and upon receiving the user input (for example by selecting the virtual representation on a touch screen), a message may be communicated to store personnel to request a different shoe size.

The mobile device 102 may further comprise a communication unit for communicating the message, for example to a central server connected to the system 100.

Figure 2B:
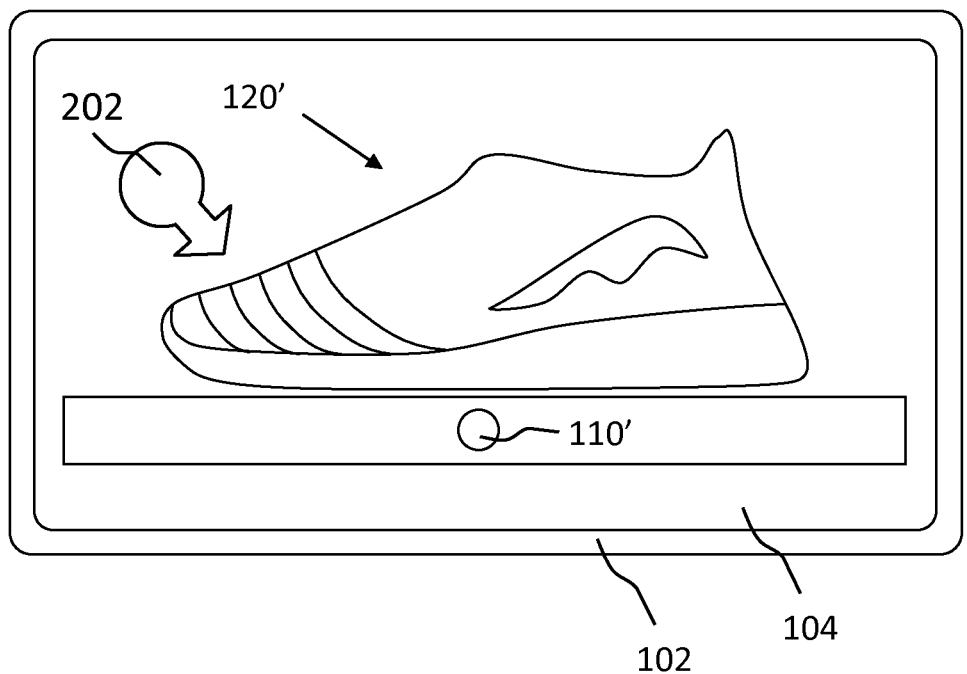

FIG. 2b illustrates an example of a virtual representation 202 which may be selected by a user. The virtual representation 202 may provide a link to additional information (e.g. to a video about the object or an object feature). Alternatively, the virtual representation 202 may be a feedback button which enables a user to provide feedback about the object 120. The feedback may be communicated from the mobile device 102 to a central server which stores the feedback from multiple users. Alternatively, the virtual representation 202 may initiate the transmission of a request message to personnel of the store wherein the object is located. The message may also provide an indication of where in the store the object is located, which helps the personnel to locate the user who transmitted the request. Additionally, a user may provide input related to a question he or she has (e.g. a question about the size, colors, price, etc. which may for example be provided by the user by means of text entry or recorded spoken input).

The processor of the mobile device 102 may be further arranged for communicating with a (central) controller, which controller may be connected to the light source. The controller may be arranged for controlling the light output of the light source 110. The controller may be arranged for driving the light source 110 such that it emits light comprising the code. The controller may be further arranged for determining which code is to be emitted by the light source 110. The controller may be further arranged for controlling the color, saturation and/or intensity of the light emitted by the light source 110. The mobile device 102 may be arranged for communicating a message to the controller when the user input has been received. The controller may receive the message from the mobile device 102 and change the light output of the light source 110. The light output may be determined based on a type of user input (e.g. a request for assistance from store personnel may result in a different light output color than a request for additional information about the object 120).

The light source 110 may be any type of light source (e.g. an LED light source, an OLED light source, etc.) for emitting light comprising an embedded code. The system 100 may further comprise a driver (not shown) for driving the light source 100 such that the emitted light comprises the embedded code representative of object information about the object 120. The embedded code may be created by any known principle of embedding a code in light, for example by controlling a time-varying, modulated current to the one or more light sources to produce variations in the light output, by modulating the amplitude of the light, etc.

Figure 3A:
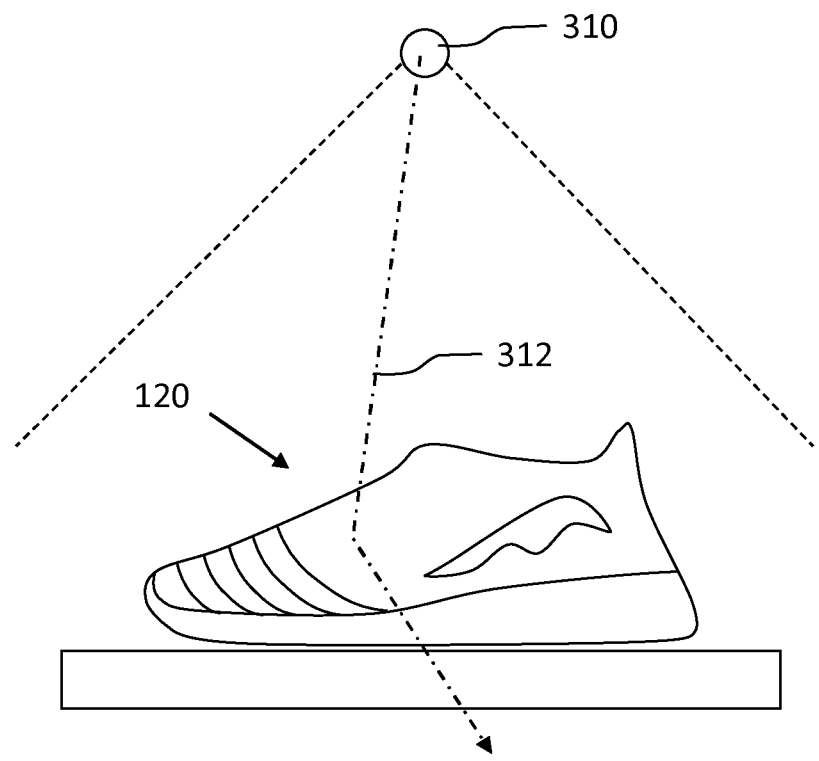
FIGS. 3a and 3b show schematically embodiments of a product display according to the invention for providing light comprising an embedded code.

The light source may be comprised in a supporting member 140 arranged for supporting the object 120. The supporting member 140 may, for example, be a product shelf. Alternatively, as illustrated in FIG. 3a, the light source 310 may be positioned such that it is arranged for illuminating the object 120. The light 312 emitted by the light source 310 may be reflected by the object 120 such that a camera or a photodiode of the mobile device 102 may detect the light 312 comprising the embedded code. Alternatively, the light source may be positioned such that a user operating the mobile device 102 and observing the object 120 is located between the light source and the object 120. The mobile device 102 may comprise a front-facing light detector (e.g. a camera or a photodiode) for capturing the light emitted by the light source 110 and a back-facing camera for capturing the image 104 of the object 120.

Figure 3B:
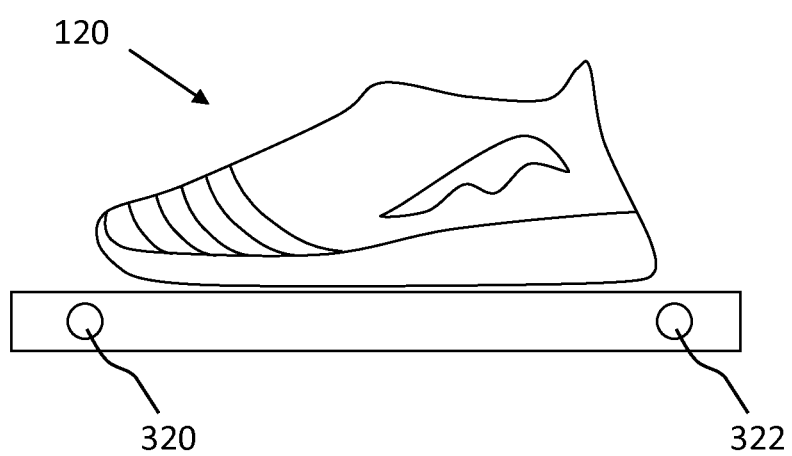

Capturing the image 104 of the object 120 may further comprise capturing an image of the object 120 and the light source 110. The light source may have a predefined position in relation to the object 120. In the example of FIG. 1, the light source 110 (which is comprised in a supporting member 140) has a predetermined position to the object 120. An object 120, such as a shoe, will always be positioned on top of the supporting member 140. Thus, if the position of the light source 110 is predetermined (and therefore known to the processor), the position of the object (and therewith the position of an object feature) can be inferred from the position of the light source 110. In a further embodiment, as illustrated in FIG. 3b, the system 100 may comprise a first light source 320 and a second light source 322. The processor may be arranged for determining the positions of the first and second light source 320, 322 in the image 104 in order to determine the position of the object 120 which, in this example, is related to the position of the light sources 320, 322. It may be beneficial to use a plurality of light sources with a predetermined position in relation to the object, because this enables determining the position of the object 120 more accurately.

The system may further comprise a memory for storing object identifiers associated with objects 120. The mobile device 102 may be arranged for detecting light emitted by the light source 110, which light comprises an embedded code representative of an identifier of the object 120. The processor of the mobile device 102 may be arranged for retrieving the code from the light and for retrieving the identifier from the code. The mobile device 102 may further comprise a user interface arranged for receiving user input indicative of a selection of the object 120. The processor may be arranged for storing the identifier of the object 120 in a memory upon receiving the user input. The system may further comprise a controller for changing the color, saturation and/or the intensity of the light emitted by the light source upon receiving the user input. Changing the color, saturation and/or the intensity of the light emitted by the light source 110 provides feedback to the user that the user input has been received. The (new) color, saturation and/or intensity may be based on the type of user input.

The user interface may be any type of user interface arranged for receiving the user input. The user interface may for example comprise a touch-sensitive device 104 such as a touchpad or a touchscreen. Upon detecting the code, and thereby identifying the object 120, the processor may, for example, render a shopping cart icon on the touchscreen. The user may, for example, provide a touch input to select the icon and thereby add the object to the shopping cart, whereupon the mobile device 102 communicates to the control (e.g. via a wireless network) that the object has been added to a list in a memory (in this case to the shopping cart), whereupon the controller may change the light output of the light source 110. Alternatively, the user interface may be arranged for receiving a first swipe gesture in a first direction, whereupon the object 120 may be added to a favorites list, and for receiving a second swipe gesture in a second direction, whereupon the object 120 may be added to a non-favorites list. The controller may be arranged for controlling the light output based on which user input has been received (e.g. turn the light to green or blink the light green when the first swipe gesture has been received and turn the light to red or blink the light red when the second swipe gesture has been received).

Additionally or alternatively, the user interface may comprise a microphone arranged for receiving voice commands from the user operating the mobile device. Example of voice commands may be: "Add this object to my shopping cart", or "I like this product", whereupon the processor of the mobile device may store the identifier of the object in a part of the memory based on the user input command.

Additionally or alternatively, the user interface may comprise a gesture/motion detection means, such as a gyroscope and/or an accelerometer arranged for detecting gestures made with the mobile device, which gestures may be indicative adding the object to a list in a memory. Examples of such gestures are shaking the mobile device 102 or changing the orientation of the mobile device 102, which may be indicative of adding the object 120 to a specific list in a memory. The mobile device 102 may, for example, be smart glasses, and the shaking of a person's head may be the gesture (e.g. nodding with the head may be indicative of adding a product to a first list and shaking with the head may be indicative of adding a product to a second list).

Additionally or alternatively, the user interface may comprise a camera (e.g. a front facing camera on a smartphone) arranged for detecting user gestures indicative of adding the object 120 to a specific list in a memory. Examples of such gestures are hand movements, eye-blinking, head shaking, etc.

Additionally or alternatively, the user interface may comprise a means (e.g. a camera) for gaze detection and adding the object 120 to a list or not may be based on a time period of gazing towards the position of the object 120.

It should be noted that the above-mentioned user interfaces are mere examples of user interfaces and illustrate rather than limit the invention, and that those skilled in the art will be able to design many alternative user interfaces without departing from the scope of the appended claims.

The user input may be related to a step in a process, which process comprises a plurality of steps, and the controller may be arranged for changing the color, saturation and/or the intensity of the light based on the step. The process may, for example, be buying one or more objects in a store. The process may comprise a first step of adding one or more objects to a shopping cart, whereupon the controller may change the light output of a respective light source to orange, a second step of placing the order for one or more objects whereupon the controller may change the light output of respective light sources to blue, and a third step of paying for all the objects that are in the shopping cart, whereupon the controller may change the light output of respective light sources to green when payment has been received, or to red when payment has been cancelled.

The controller may be arranged for changing the color, saturation and/or the intensity of the light emitted by the light source back to an original color and/or intensity after a period of time. The controller may, for example, be arranged for blinking the light briefly (e.g. for one second) to indicate that the user input has been received. The controller may be further arranged for changing the color, saturation and/or the intensity of the light emitted by the light source back to an original color and/or intensity when the code is no longer detected. When the user moves away from the object (and also away from the product) and the light (and therewith the code) is no longer detected by the mobile device 102, the light output of the light source 110 may be changed back to an original color and/or intensity. If a new user approaches with a mobile device 102, he or she may add the object 120 to his or her own list, whereupon the light output is changed again accordingly.

The controller may be further arranged for detecting a presence of a mobile device 102 and identifying the mobile device 102. The presence may, for example, be detected when the mobile device has been added to the same network as the controller, or, when a coded light emission of a light source 110 has been received at the mobile device 102, the mobile device 102 may communicate its presence (and an identifier) to the controller. Upon detecting the presence of the mobile device 102, the controller may change the color, saturation and/or the intensity of the light emitted by the light source 110 based on the identification of the mobile device. If, for example, the mobile device 102 has been interacting with an object 120 before, and the object 120 has already been added to a list in a memory, the controller may change the color of the light source associated with that object to a color, saturation and/or brightness that is associated with that list.

Figure 4:
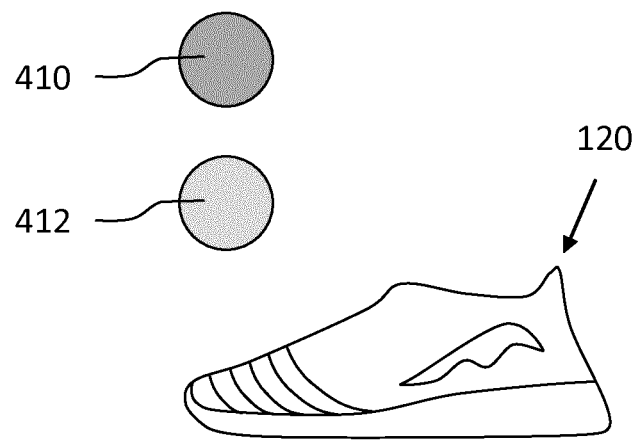
FIG. 4 shows schematically an embodiment of a system according to the invention for providing information about an object.
Figure 4:
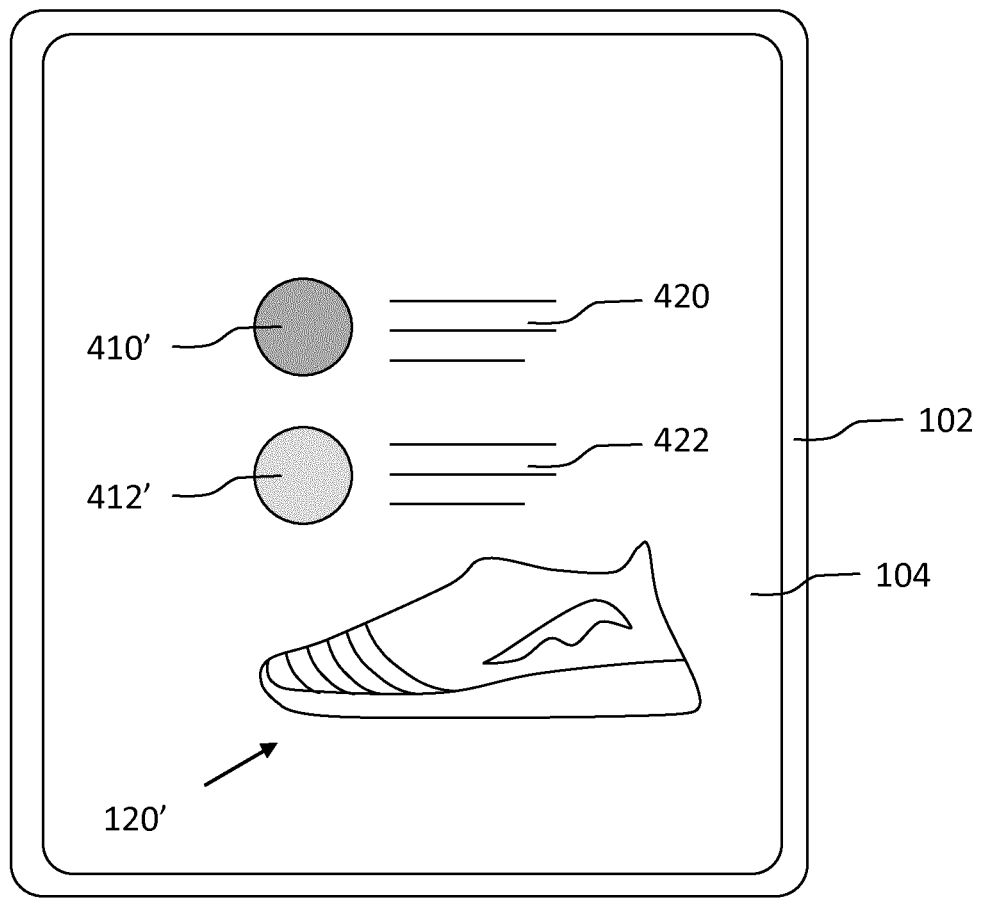

The controller may be arranged for changing the color, saturation and/or the intensity of the light emitted by the light source 110 based on predefined light settings, user preferences, user profiles, etc. The controller may, for example, access a user profile associated with the user operating the mobile device 102 in order to retrieve user preference settings related to preferred light settings. A user may provide these preferences, which enables the user to personalize the light feedback that is provided upon providing a user input indicative of the selection of the object 120. The mobile device 102 may comprise a user interface arranged for receiving further user input related to setting these preferences. This may be beneficial, because it may help users in recognizing their own light effects, FIG. 4 shows schematically an embodiment of a lighting system according to the invention for providing information about an object 120. The lighting system may comprise a controller (not shown) for receiving object information about the object 120, for determining a first light setting and a second light setting based on the object information, wherein the difference between the first light setting and the second light setting is perceivable for a user. The object information may be a value indicative of any type of object information, and the controller may be arranged for determining color values for the light settings based on the value indicative of the object information. The controller (e.g. a processor connected to a driver) may be further arranged for controlling a first light source 410 according to the first light setting and for controlling a second light source 412 according to the second light setting. The controller may, for example, be a central controller for controlling a plurality of sets of light sources which are associated with a plurality of objects. The light emitted by the light source comprises the code representative of the object information. The controller may be commissioned in advance such that the light sources associated with (and preferably in close proximity to) an object are controlled according to the object information of that object. In other words, the association between the object and the light sources may be predefined.

The system may further comprise a mobile device 102 comprising a light detector (e.g. a photodiode or a camera) for detecting light comprising an embedded code, which embedded code is representative of the object information. The mobile device 102 may further comprise a processor (not shown in FIG. 4) for retrieving the code from the light, for retrieving the object information and for rendering the object information on the display.

The controller may be arranged for determining a first light setting and a second light setting based on the object information, whereupon the controller may control the first light source 410 and the second light source 412 according to the light settings. This is beneficial because the object information is communicated to a user via light (i.e. via the two light sources). For example, the object information about the object 120 may be related to available colors of the object 120. The controller may control the first light source 410 according to a green light setting, and the second light source 412 according to a red light setting. As soon as the red colored object 120 is no longer available, the controller may control the second light source 412 according to the green setting, or, alternatively, according to another color that is available. If the user wishes to receive more information about what the colors of the light mean, he or she can point the light detector of the mobile device 102 to the light sources 410, 412, whereupon the processor retrieves the code, and therewith the additional object information, from the detected light. The processor may further render the object information on a display of the mobile device 102. The processor may, for example render the available colors of the object on the display. In another example, the object information about the object 120 may be related to reviews of the object 120. The controller may control the first light source 410 according to a bright green light setting (indicating that many people like this object 120), and the second light source 412 according to a dim red light setting (indicating that not many people dislike this object 120). As soon as more people start disliking the object 120, the controller may dim the first light source 410 and increase the brightness of the second light source 412. If the user wishes to receive more information about what the colors of the light mean, he or she can point the light detector of the mobile device 102 to the light sources 410, 412, whereupon the processor may retrieve the code, and therewith the additional object information, from the detected light. The processor may further render the object information on a display of the mobile device 102. The processor may, for example render the popularity value (e.g. the number of positive and the number of negative reviews) on the display.

The controller may be further arranged for controlling the first light source 410 and/or the second light source 412 such that the first light source and/or the second light source emit(s) the embedded code representative of the object information about the object 120. This requires a user to point the light detector of the mobile device 102 to the light sources 410, 412 in order to receive the additional object information. Alternatively, the processor may control a third light source such that it emits light comprising the embedded code. This may be beneficial, because a change in color, saturation and/or brightness of the first and second light source will not influence the signal strength of the code embedded in the light.

The controller may be further arranged for controlling the first light source 410 such that it emits a first embedded code, which first embedded code is representative of first object information about the object, and for controlling the second light source 412 such that it emits a second embedded code, which second embedded code is representative of second object information about the object. In this embodiment, the light detector may be arranged for detecting light comprising the first embedded code and detecting light comprising the second embedded code. The processor may be further arranged for retrieving the first embedded code and the second embedded code from the respective light, and for retrieving the first object information and the second object information from the respective codes, and for rendering the first object information and the second object information on the display. The first light source 410 may, for example, emit a code representative of the number of likes of the object, and the second light source 412 may, for example, emit a code representative of the number of dislikes of the object.

The mobile device 102 may comprise a camera for capturing an image 104 of the first light source 410 and the second light source 412. The processor may be further arranged for rendering the image 104 on a display and rendering a virtual representation of the object information as an overlay on the image 104. Additionally, the processor may be arranged for determining a first light source position 410' of the first light source 410 and a second light source position 412' of the second light source 412 in the image 104. The processor may be further arranged for determining a position of the virtual representation on the display, wherein the position is related to at least one of the first light source position and the second light source position in the image, and for rendering the virtual representation of the object information at the position. This may be executed by the processor according to any one of the above-mentioned examples, wherein the position of the virtual representation is determined based on the position of the object. This enables the processor to provide the object information in the vicinity of the light sources in the image. Additionally, the processor may determine the position of the object 120 and/or object features in the image, and takes this position into account while determining the position of the virtual representation. FIG. 4 illustrates an example wherein the location of the virtual representations 420, 422 of the object information are rendered next to the light sources 410', 412'. Thus, if a user requires additional information about what object information the light settings of the light sources convey, he or she can simply point the camera to the light sources, whereupon the additional information is provided next to the light sources.

The controller may be further arranged for determining the first and second light settings based on a user profile of the user operating the mobile device 102. The controller may be arranged for accessing the user profile (e.g. a social media profile, a user profile stored on the mobile device, etc.). The controller may further select the object information from a set of stored object information based on the user profile. For example, the controller may retrieve from the user profile that a user has a certain foot size, and provide availability information about the sizes of a shoe (the object 120). In another example, the controller may receive information about how many friends of a user own an object 120, and determine the first light setting and the second light setting based thereon for each product of a plurality of products. This enables a user to see how many of his or her friends own an object 120 (e.g. a pair of shoes, or shoes of a specific brand).

Figure 5A:
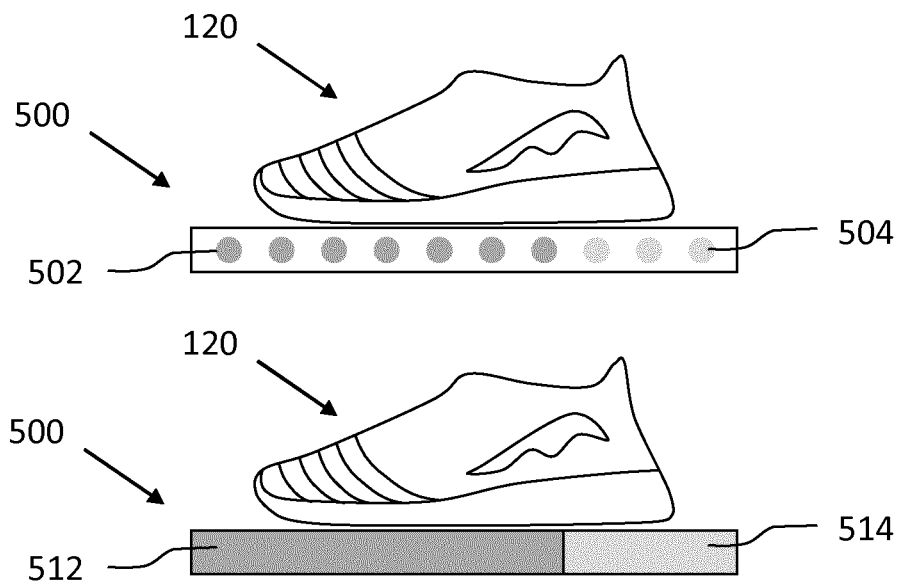
FIG. 5a shows schematically embodiments of a product display according to the invention for providing information about an object.
Figure 5B:
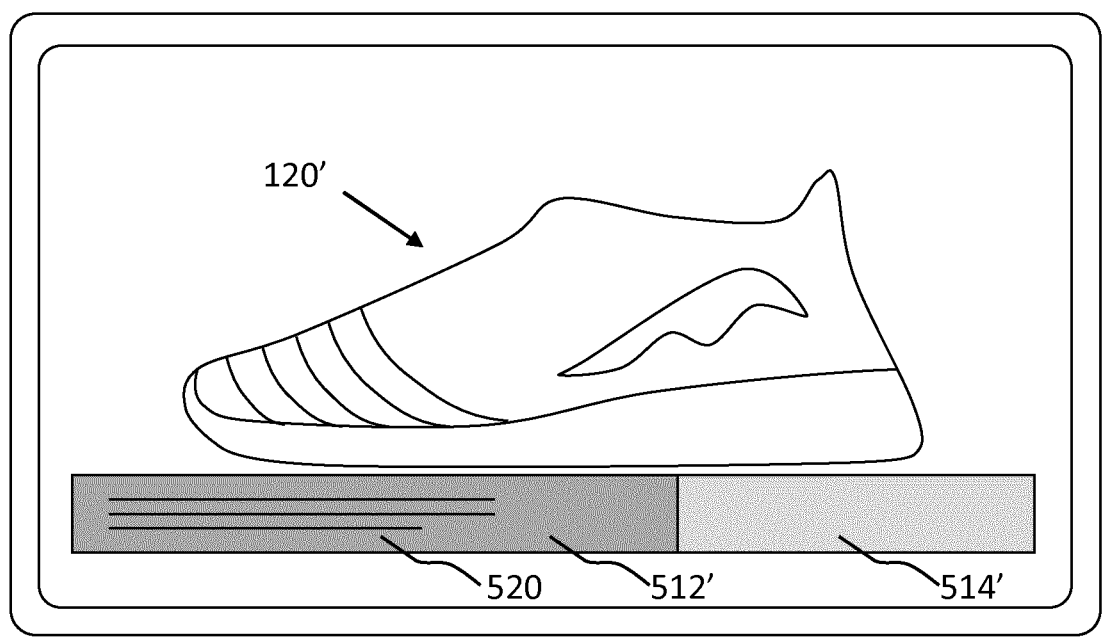
Figure 6:
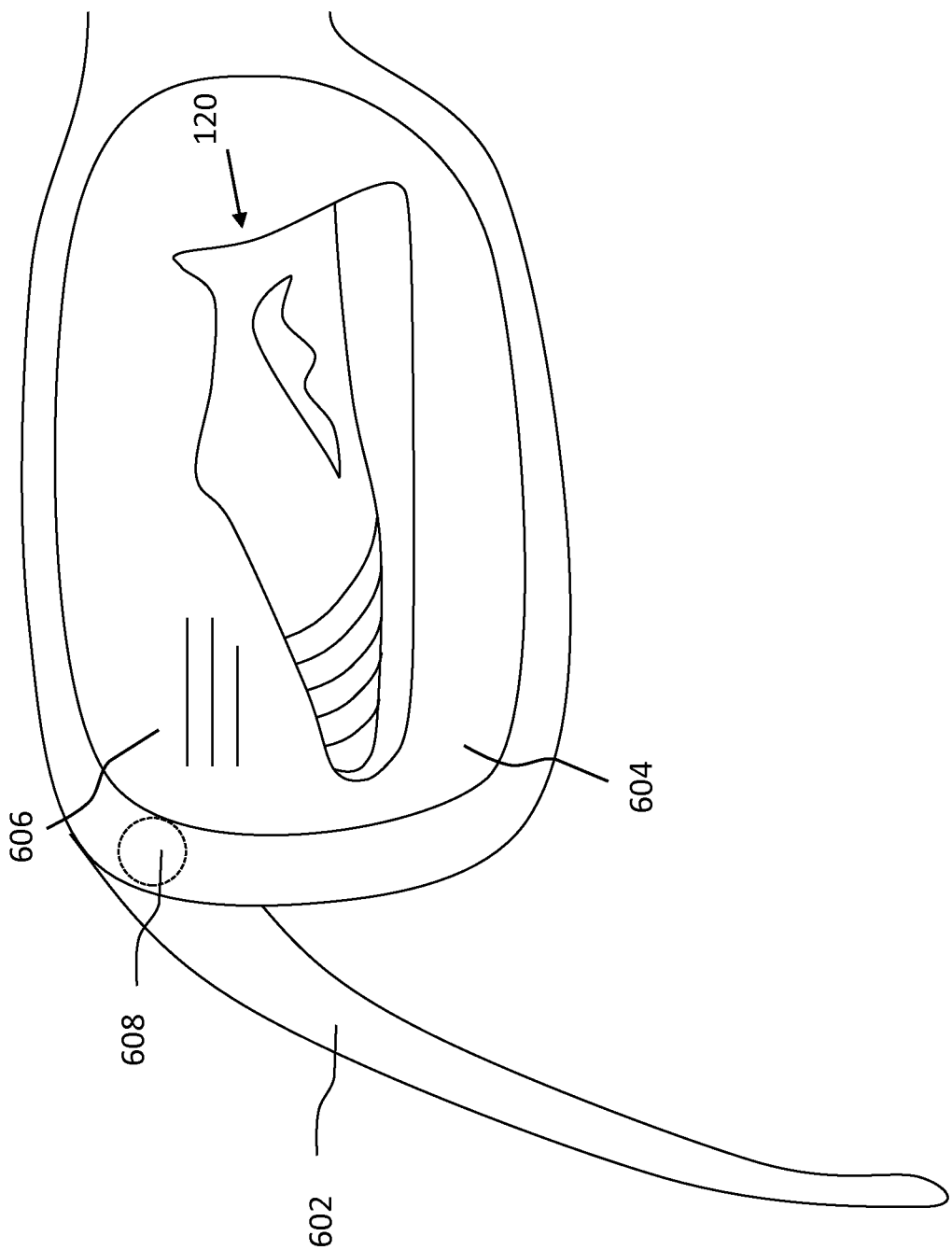
FIG. 6 shows schematically an embodiment of a part of a wearable mobile device according to the invention for providing information about an object.

The first and the second light sources may be comprised in a linear lighting device, such as an LED strip. The linear lighting device may comprise a plurality of individually controllable light sources, and the controller may be arranged for controlling each of the plurality of light sources. The controller may be further arranged for determining which light sources to control according to the first light setting and which light sources to control according to the second light setting based on the object information. FIG. 5a illustrates an example of a linear lighting device 500 comprising a plurality of individually controllable light sources. The upper linear lighting device shows the individual light sources and the lower linear lighting device in FIG. 5a shows how the user may see the linear lighting device 500 when a diffuser has been attached to the linear lighting device 500. The controller may receive object information (for example stock information about the object 120), and determine how to control the light sources in order to communicate to a user how many shoes are still in stock.

For example, the controller may receive object information indicative of that the current stock is 70% of the maximum stock. Therefore, the controller may determine to control the seven light sources 502, 512 on the left according to a first light setting (e.g. a green color) and control the three light sources 504, 514 on the right according to a second light setting (e.g. a red color). A user will be able to see the object information when he or she looks at the linear lighting device, but the specific information that is being conveyed may not be clear to the user. The user may therefore point the light detector (e.g. the camera) towards the light sources, whereupon a code in the light (which may be emitted by one or more of the light sources comprised in the linear lighting device) is detected. The processor may capture an image with the camera of the light sources, whereupon the processor of the mobile device renders a virtual representation 520 (see FIG. 5b) on the display, thereby informing the user what the (colored) light setting means. The virtual representation may, for example, be rendered on top of the linear lighting device 512', 514' in the image.

The above-mentioned system may comprise different components, ranging from mobile devices to controllers, memories and light sources. It should be understood that these components may be coupled to each other, comprised in each other and/or that these components may be arranged for communicating with each other. The components may comprise transmitters and/or receivers arranged for communicating amongst each other. The transmitters and/or receivers may comprise hardware for transmitting and or receiving messages and/or control commands via any wired or wireless communication protocol. Various wired and wireless communication protocols may be used, for example Ethernet, DMX, DALI, USB, Bluetooth, Wi-Fi, Li-Fi, 3G, 4G or ZigBee. A specific communication technology may be selected based on the communication capabilities of the light sources, the controller and/or the mobile device, the power consumption of the communication driver for the (wireless) communication technology and/or the communication range of the signals.

Figure 7:
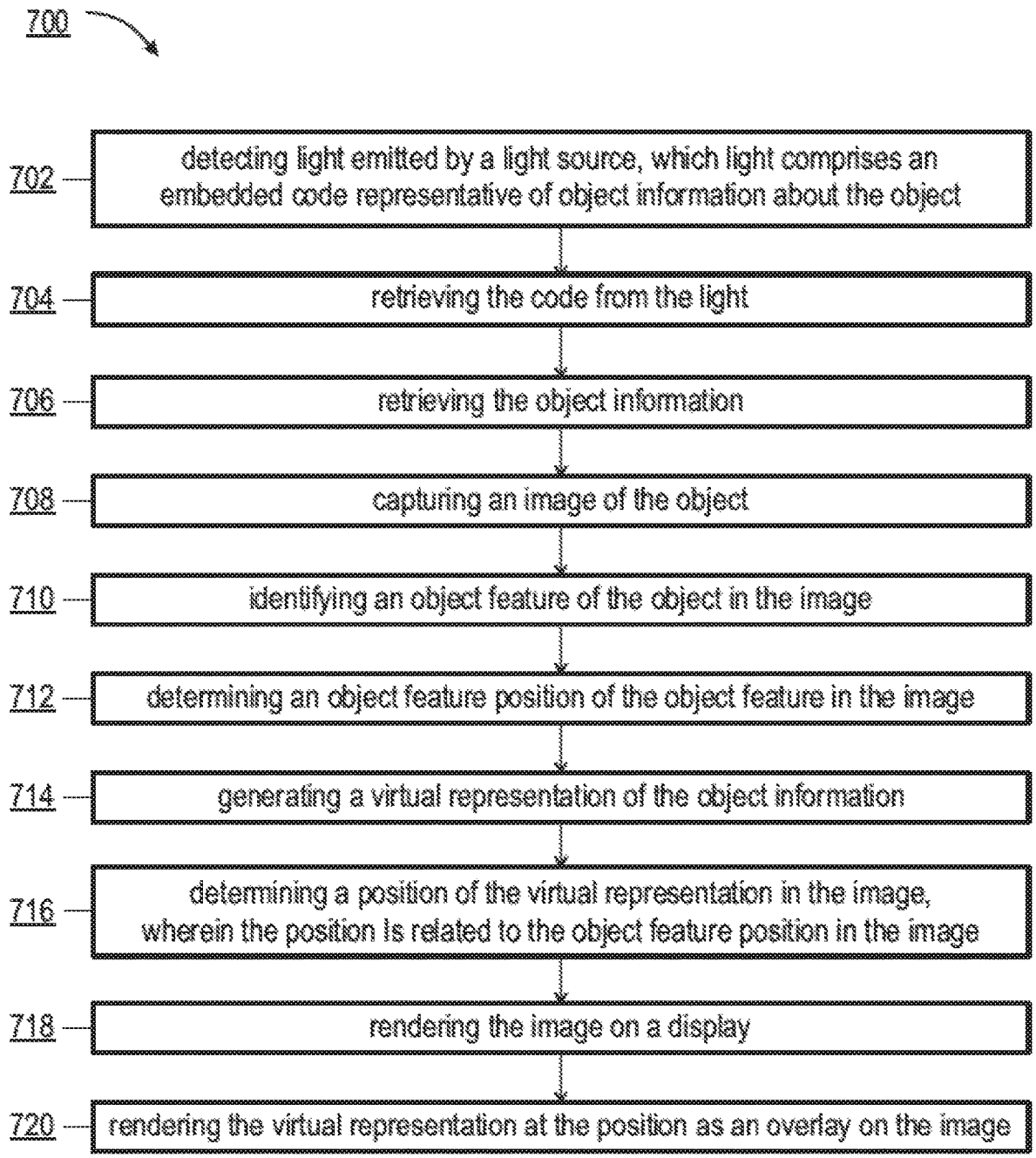
FIG. 7 shows schematically a method according to the invention of providing information about an object.

FIG. 7 shows schematically a method 700 according to the invention of providing information about an object. The method 700 comprises the steps of detecting 702 light emitted by a light source, which light comprises an embedded code representative of object information about the object, retrieving 704 the code from the light, retrieving 706 the object information, capturing 708 an image of the object, identifying 710 an object feature of the object in the image, determining 712 an object feature position of the object feature in the image, generating 714 a virtual representation of the object information, determining 716 a position of the virtual representation in the image, wherein the position is related to the object feature position in the image, rendering 718 the image on a display, and rendering 720 the virtual representation at the position as an overlay on the image.

Figure 8:
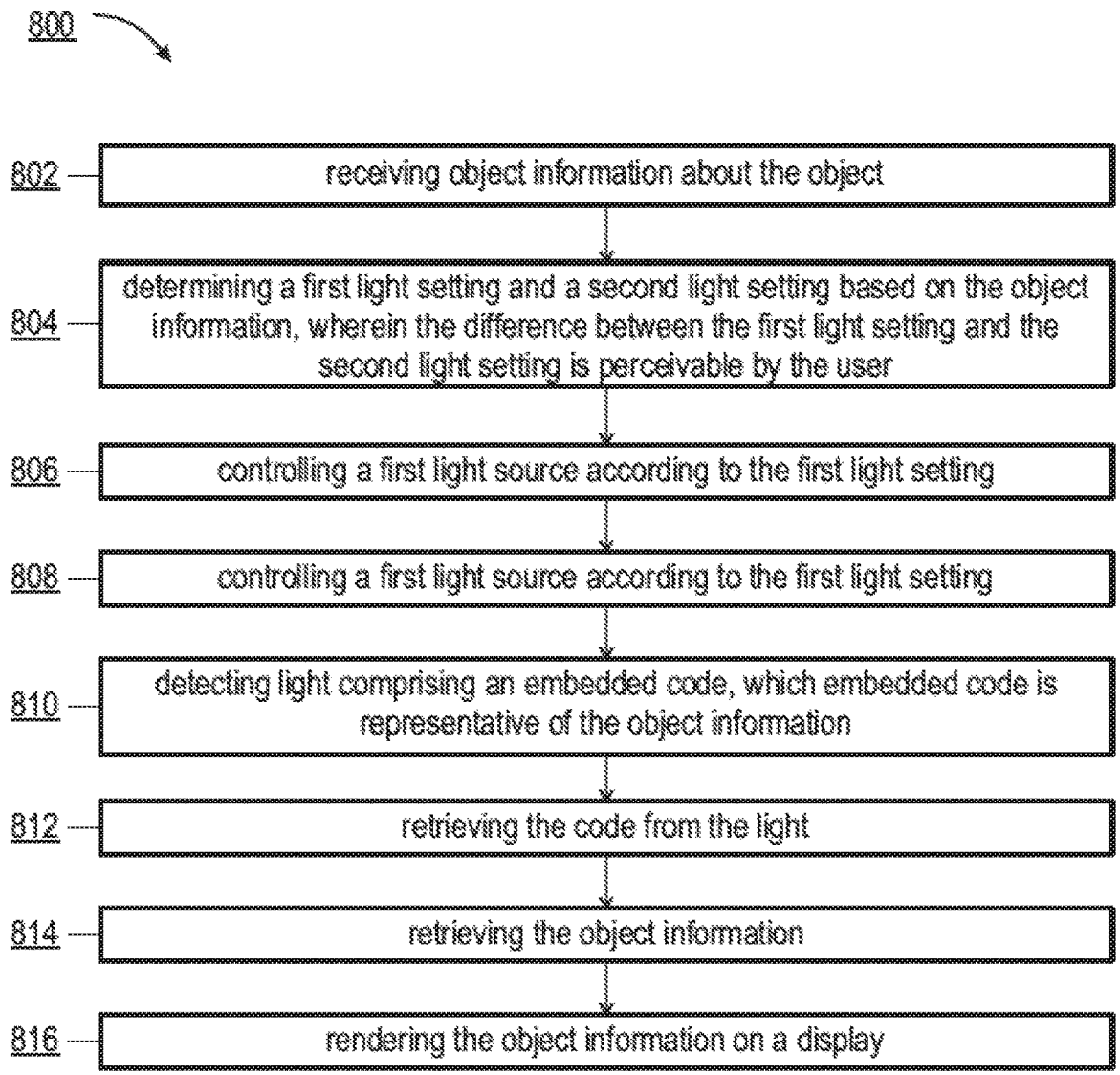
FIG. 8 shows schematically a method according to the invention of providing information about an object.

FIG. 8 shows schematically a method 800 according to the invention of providing information about an object. The method 800 comprises the steps of receiving 802 object information about the object, determining 804 a first light setting and a second light setting based on the object information, wherein the difference between the first light setting and the second light setting is perceivable for a user, controlling 806 a first light source according to the first light setting, controlling 808 a second light source according to the second light setting, detecting 810 light comprising an embedded code, which embedded code is representative of the object information, retrieving 812 the code from the light, retrieving 814 the object information and rendering 816 the object information on a display.

Figure 9:
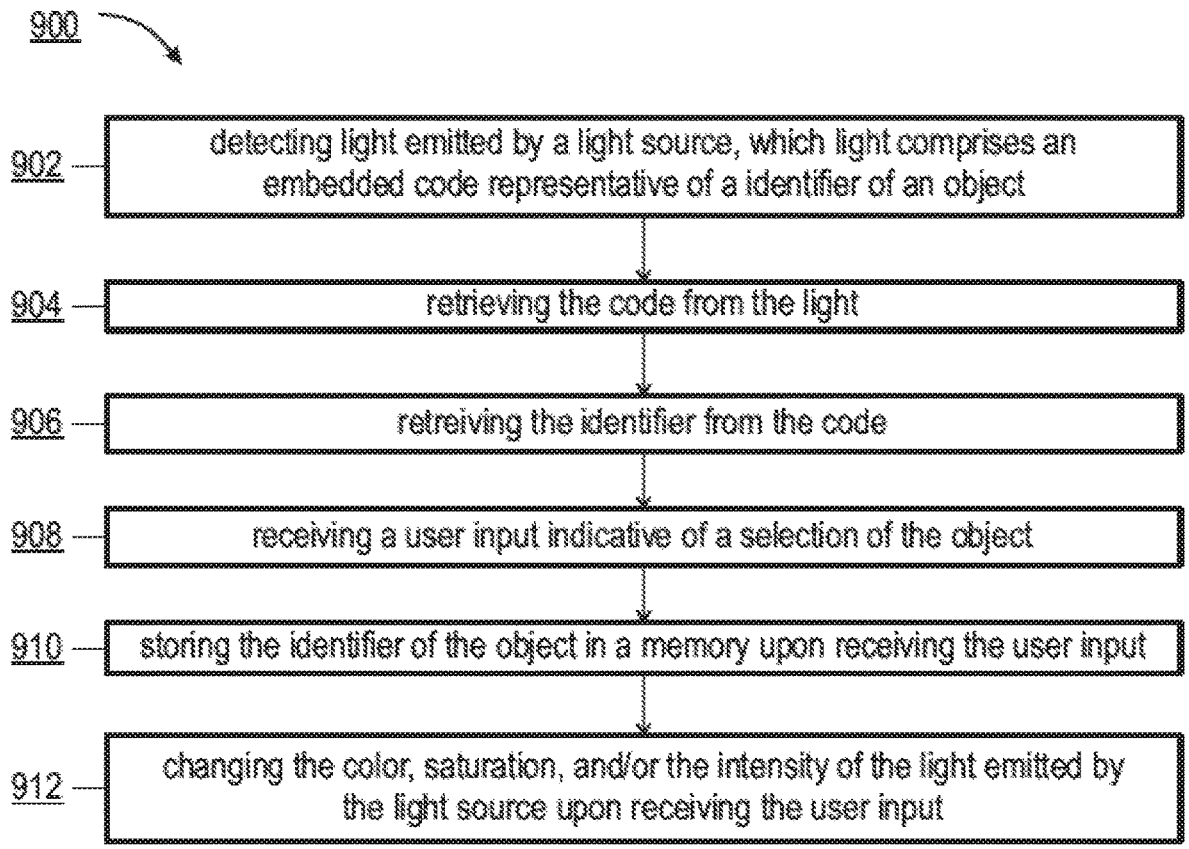
FIG. 9 shows schematically a method according to the invention of storing object identifiers.

FIG. 9 shows schematically a method 900 according to the invention of storing object identifiers. The method 900 comprises the steps of detecting 902 light emitted by a light source, which light comprises an embedded code representative of an identifier of an object, retrieving 904 the code from the light, retrieving 906 the identifier from the code, receiving 908 a user input indicative of a selection of the object, storing 910 the identifier of the object in a memory upon receiving the user input, changing 912 the color, saturation and/or the intensity of the light emitted by the light source upon receiving the user input.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of adding an object to a list stored in a memory, the method comprising:
   detecting, by a light detector, light emitted by a light source, which light comprises an embedded code representative of an identifier of the object, the object being associated with the light source, wherein the object is not the light source,
   retrieving the code from the light,
   retrieving the identifier from the code,
   receiving, via a user interface, a user input indicative of a selection of the object, adding the identifier of the object to the list stored in the memory upon receiving the user input, and changing, by a controller, the color, saturation and/or the intensity of the light emitted by the light source upon receiving the user input, wherein the step of receiving the user input indicative of the selection of the object comprises receiving a first user input or a second user input as the user input, and wherein the step of storing the identifier of the object in a memory upon receiving the user input comprises storing the identifier of the object in a first part of the memory upon receiving the first user input or storing the identifier of the object in a second part of the memory upon receiving the second user input.

2. The method of claim 1, further comprising the step of changing the color, saturation and/or the intensity of the light emitted by the light source back to an original color and/or intensity after a period of time.

3. The method of claim 1, further comprising the step of changing the color, saturation and/or the intensity of the light emitted by the light source back to an original color and/or intensity when the code is no longer detected.

4. The method of claim 1, further comprising the steps of:
capturing an image of the object, and
rendering the image on a display.

5. The method of claim 1, further comprising the steps of:
retrieving object information of the object based on the identifier,
generating a virtual representation, which virtual representation is representative of the object information, and
rendering the virtual representation of the object on a display.

6. The method of claim 1, wherein receiving the user input is indicative of a step of a plurality of steps in a process, and wherein the step of changing the color, saturation and/or the intensity of the light emitted by the light source upon receiving the user input comprises changing the color, saturation and/or the intensity of the light based on the step.

7. The method of claim 1, wherein the step of changing the color, saturation and/or the intensity of the light emitted by the light source upon receiving the user input comprises changing the color, saturation and/or the intensity of the light source according to a first light setting upon receiving the first user input or changing the color, saturation and/or the intensity of the light source according to a second light setting upon receiving the second user input.

8. The method of claim 1, further comprising the steps of:
detecting a presence of a mobile device,
identifying the mobile device, and
changing the color, saturation and/or the intensity of the light emitted by the light source based on the identification of the mobile device.

9. A non-transitory computer program product for a computing device, the computer program product comprising computer program code to perform the method of claim 1 when the computer program product is run on a processing unit of the computing device.

10. A system for adding an object to a list stored in a memory, the system comprising:
a mobile device comprising:
a light detector for detecting light emitted by a light source, which light comprises an embedded code representative of an identifier of the object, the object being associated with the light source, wherein the object is not the light source,
a processor for retrieving the code from the light and for retrieving the identifier from the code, and
a user interface for receiving a user input indicative of a selection of the object, wherein the processor is arranged for adding the identifier of the object to the list stored in the memory upon receiving the user input, and
wherein the system further comprises a controller for changing the color, saturation and/or the intensity of the light emitted by the light source upon receiving the user input,
wherein the mobile device further comprises a display, and wherein the processor is further arranged for rendering a virtual representation of the object on the display, and wherein the user interface is arranged for receiving a first user input and a second user input as the user input, and wherein the processor is further arranged for storing the identifier of the object in a first part of the memory upon receiving the first user input, and for storing the identifier of the object in a second part of the memory upon receiving the second user input.

11. The system of claim 10, wherein the controller is arranged for changing the color, saturation and/or the intensity of the light source according to a first light setting upon receiving the first user input, and for changing the color, saturation and/or the intensity of the light source according to a second light setting upon receiving the second user input.

12. The system of claim 10, wherein the system further comprises the light source, and wherein the light source is comprised in a supporting member arranged for supporting the object.

13. A method of adding an object to a list stored in a memory, the method comprising:
detecting, by a light detector, light emitted by a light source, which light comprises an embedded code representative of an identifier of the object, the object being associated with the light source,
retrieving the code from the light,
retrieving the identifier from the code,
receiving, via a user interface, a user input indicative of a selection of the object,
adding the identifier of the object to the list stored in the memory upon receiving the user input, and
changing, by a controller, the color, saturation and/or the intensity of the light emitted by the light source upon receiving the user input,
wherein receiving the user input is indicative of a step of a plurality of steps in a process,
wherein the step of changing the color, saturation and/or the intensity of the light emitted by the light source upon receiving the user input comprises changing the color, saturation and/or the intensity of the light based on the step,
wherein the step of receiving the user input indicative of the selection of the object comprises receiving a first user input or a second user input as the user input, and
wherein the step of storing the identifier of the object in a memory upon receiving the user input comprises storing the identifier of the object in a first part of the memory upon receiving the first user input or storing the identifier of the object in a second part of the memory upon receiving the second user input.

14. The method of claim 13, wherein the step of changing the color, saturation and/or the intensity of the light emitted by the light source upon receiving the user input comprises changing the color, saturation and/or the intensity of the light source according to a first light setting upon receiving the first user input or changing the color, saturation and/or the intensity of the light source according to a second light setting upon receiving the second user input.

\* \* \* \* \*